United States Patent [19]
Garuglieri

[11] Patent Number: 5,651,297
[45] Date of Patent: Jul. 29, 1997

[54] POWER SAW FENCE GUIDE

[75] Inventor: Andrea Garuglieri, Colle Brianza, Italy

[73] Assignee: Black & Decker Inc., Newark, Del.

[21] Appl. No.: 289,730

[22] Filed: Aug. 12, 1994

[30] Foreign Application Priority Data

Aug. 12, 1993 [GB] United Kingdom ............ 9316728

[51] Int. Cl.⁶ .................. B27B 5/20; B27B 5/29; B27B 27/00
[52] U.S. Cl. .............. 83/468.1; 83/471.3; 83/473; 83/477.1; 83/490; 83/522.17
[58] Field of Search .................. 83/468.2, 468.3, 83/471.3, 473, 477.1, 486.1, 490, 4, 581, 522.17, 468.1

[56] References Cited

U.S. PATENT DOCUMENTS

| | | | |
|---|---|---|---|
| 4,869,142 | 9/1989 | Sato et al. | 83/490 X |
| 4,934,233 | 6/1990 | Brundage et al. | 83/397 |
| 5,042,542 | 8/1991 | Purviance | 144/134 A |
| 5,297,463 | 3/1994 | O'Banion et al. | 83/468.3 |

FOREIGN PATENT DOCUMENTS

| | | |
|---|---|---|
| 0091558 | 10/1983 | European Pat. Off. . |
| 2270032 | 3/1994 | United Kingdom . |

*Primary Examiner*—Rinaldi I. Rada
*Assistant Examiner*—Raymond D. Woods
*Attorney, Agent, or Firm*—Charles E. Yocum; Dennis A. Dearing; Frederick H. Voss

[57] ABSTRACT

A combination mitre and bevel saw 10 includes an elongate fence guide 74 operatively connected to the saw blade assembly 20 and pivotable between a retracted position and an extended position in the plan of the saw blade 26. A spring 72 biases the fence guide 74 into its retracted position. The fence guide 74 may be pulled down by the saw operator into its extended position so as to indicate the position at which the saw blade 36 will impinge upon the workpiece and so as to allow the setting of two fence members 17a, 17b accordingly. The fence guide 74 includes a leading edge 78, which indicates the width of cut which the saw blade will make in the workpiece and a wider portion 80, trailing the leading edge 78, which indicates the optimum spacing of the fence members 17a, 17b.

5 Claims, 6 Drawing Sheets

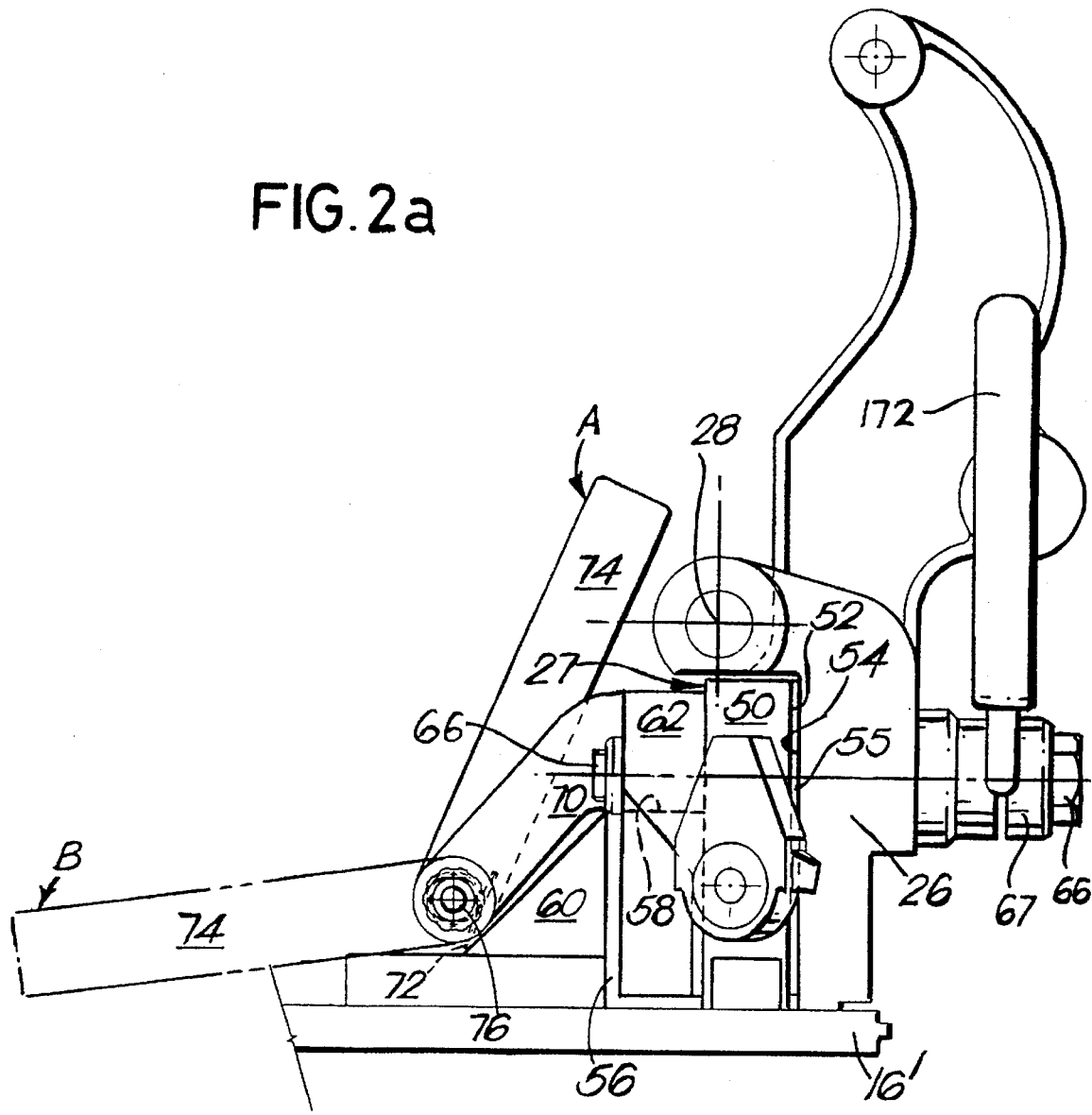

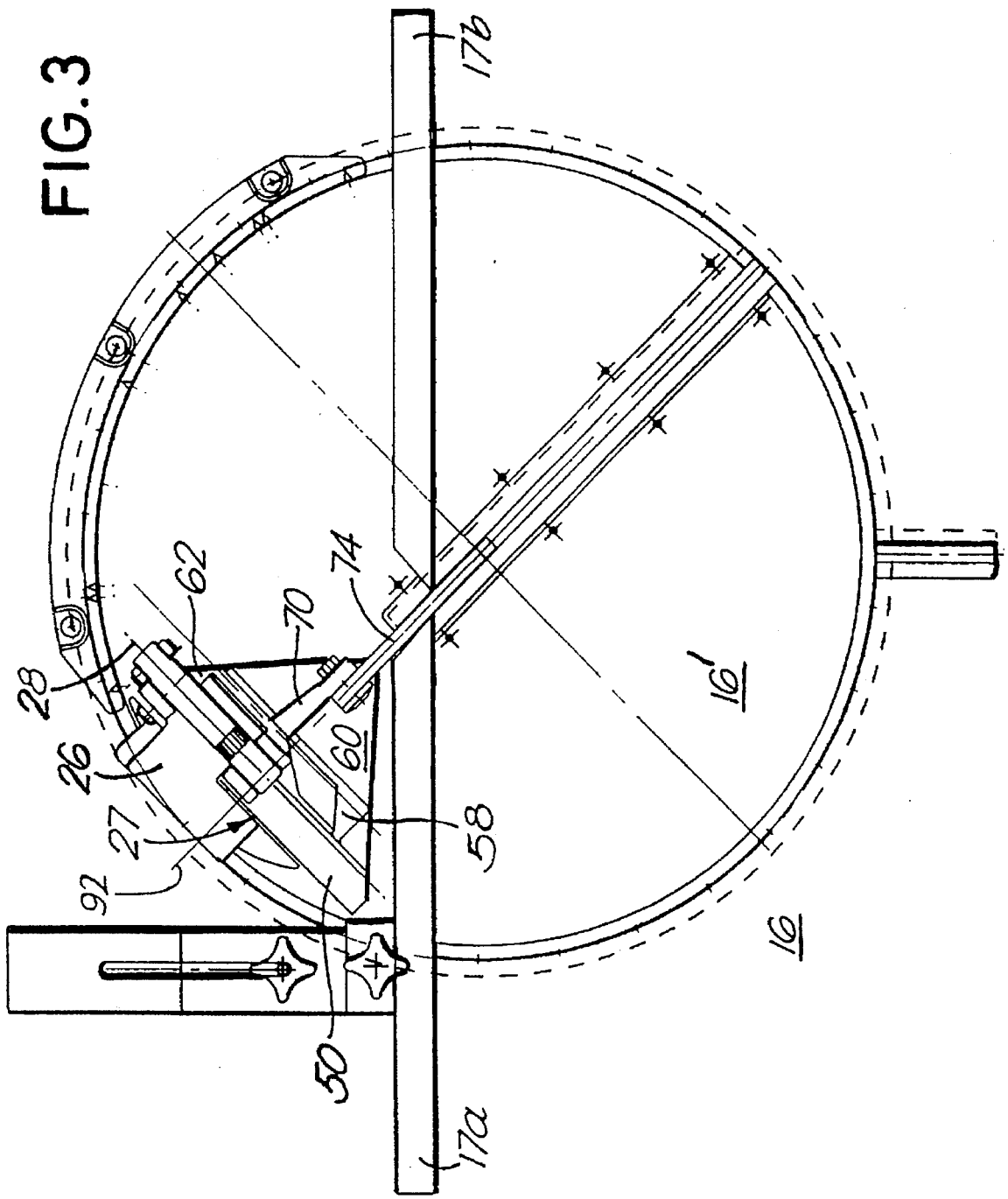

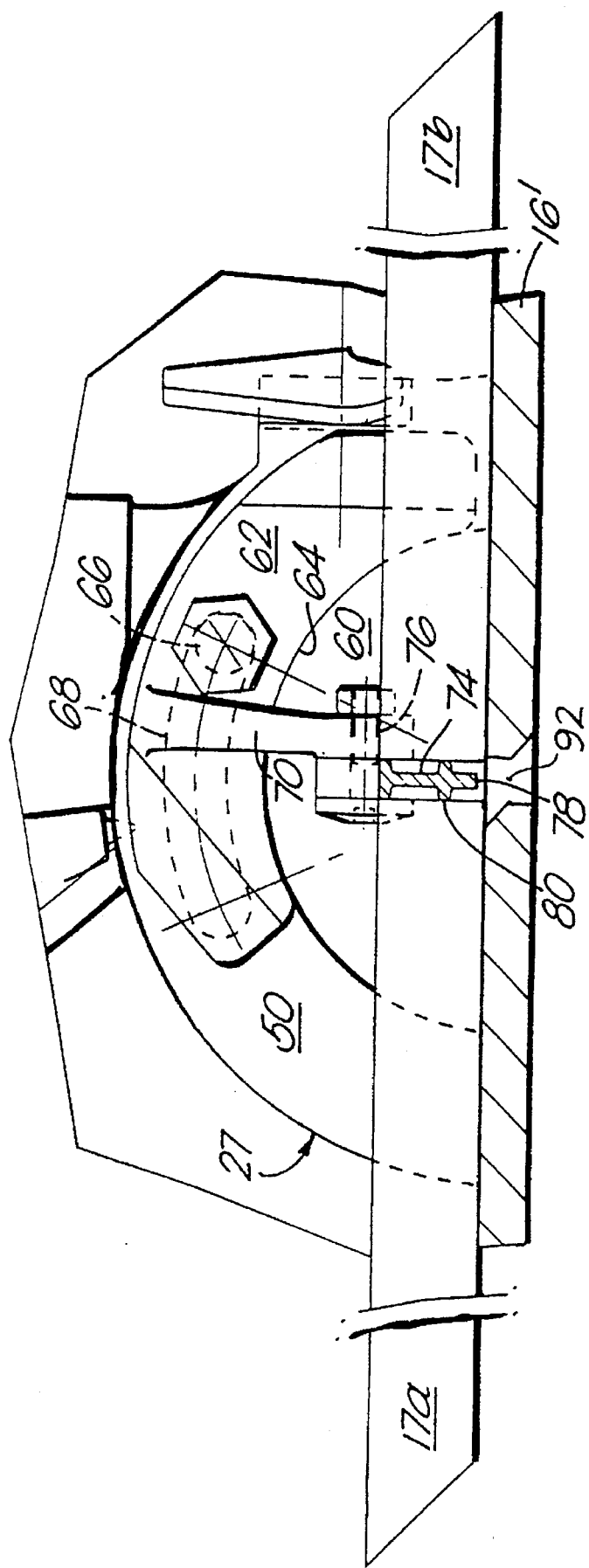

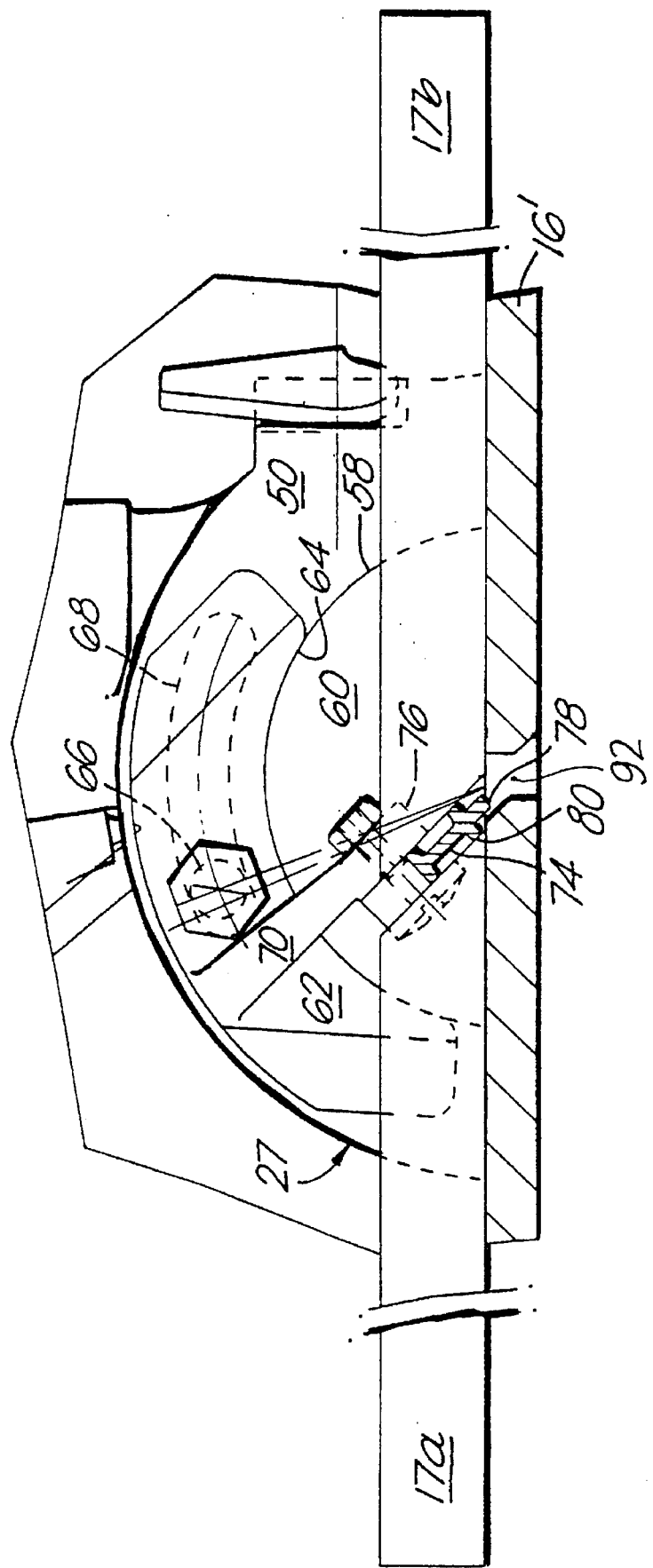

POWER SAW FENCE GUIDE

BACKGROUND OF THE INVENTION

This invention relates to power saws of the type comprising a table mounting a saw assembly having a motor driven blade adapted to cut workpieces positioned on the table. Such saws usually have a fence mounted on the table in the form of two aligned fence members which support and position the rear of the workpiece.

A gap between the fence members allows passage of the blade during cutting of the workpiece and it is desirable for this gap to be closely aligned with the passage of the blade so that splintering of the rear of the workpiece, as the blade emerges therefrom, is minimised.

Where the saw is not capable of making mitre or bevel cuts, the fence members can be fixed in the appropriate position. Where, however, mitre cuts and/or bevel cuts are to be made, the fence members are usually adjustable so that their optimum position can be obtained. This is normally achieved by first adjusting the saw to make the requisite mitre and/or bevel cut and then bringing the blade into its cutting position without the workpiece in place. The fence members are then adjusted with respect to the blade. However this is not always easy, firstly because the saw assembly usually needs to be held in its cutting position against the action of a restoring force tending it towards its rest position, and secondly, in this position, the bulk of the saw assembly gets in the way of convenient and easy adjustment of the fence members and usually restricts vision of the area around the blade.

Another problem with such saws is that it is not always easy to gauge exactly where the blade will strike the workpiece during cutting, particularly when making mitre or bevel cuts, and so correct positioning of the workpiece on the table cannot be assured. Usually the workpiece is positioned approximately correct and then the blade moved towards the workpiece without starting the motor. The point where the blade will strike the workpiece can then be seen and final adjustment of the workpiece can be effected. Again, however, this is not always so easy and for the same reasons as mentioned above. On top of those is also the problem that with a circular saw blade it will always only touch the workpiece at a point (unless the workpiece has a concave surface corresponding to edge of blade) and moreover that edge is toothed and so the line of its cut is sometimes quite difficult to gauge.

BRIEF SUMMARY OF THE INVENTION

Thus it is an object of the present invention is to provide a saw in which the setting of the fence members and the positioning of the workpiece itself are made relatively easy.

Accordingly, the present invention provides a power saw comprising a table, a saw assembly mounted on the table, the saw assembly having a motor and a blade driven by the motor, the blade lying in a plane and the saw assembly being movable in said plane to cut workpieces supported on the table, and an elongate fence guide which is pivotable with respect to the table in said plane about a first axis substantially perpendicular said plane.

Preferably the saw further includes a fence fixed to the table and against which workpieces are adapted to be positioned and supported on the table. The fence may comprise two fence members having a gap therebetween adapted to receive passage of the blade during cutting of a workpiece positioned against the fence. The fence members may be independently adjustable with respect to the table.

Thus, if the operator needs to estimate where the saw blade will impinge upon the workpiece, either so as to position the workpiece properly or to allow him to set the fence members accordingly, all he has to do is pivot the fence guide down on to the workpiece or table in the knowledge that the fence guide will move in the same plane as the saw blade, and make any adjustments which are necessary.

Preferably, the saw assembly is pivotable with respect to the table about a second axis substantially parallel said first axis.

Where the saw is capable of making bevel cuts, and it has a slot in the workpiece support or table to receive the blade, then the slot will be relatively large, since it must accommodate the saw blade at an angle. With a saw such as this, the present invention is particularly useful because the slot does not then give an accurate indication of where the blade will strike the workpiece. Thus, the saw may include a pivot member pivotally mounted with respect to the table about a third axis substantially parallel to the surface of the table and substantially coincident with the plane of the saw blade, the saw assembly and the fence guide being pivotally mounted on the pivot member about the first and second axes respectively.

In order to permit an accurate estimate of the cut which the saw blade will make in the workpiece, it is preferred that the fence guide include a leading edge having a thickness substantially equal to the cutting thickness of the saw blade. The cutting thickness of the saw blade is the thickness of the cut which it will make in the workpiece. If the saw teeth are, as is common, alternately bent in opposite directions, or are hardened metal elements set in the blade, then the cutting thickness of the saw blade will be somewhat larger than its actual thickness.

To minimise the possibility of the saw blade striking the fence members, the fence members should optimally be set somewhat further apart than the cutting thickness of the saw blade. It is therefore preferred that the fence guide include a region trailing its leading edge and having a thickness larger than the cutting thickness of the saw blade.

For convenience, it is preferred that the fence guide be biassed towards a retracted position.

Naturally, it is preferred that the saw includes a fence as mentioned above, but it will have been appreciated from the foregoing that the fence guide is equally useful in indicating the position at which the saw blade will impinge upon the workpiece. The invention is applicable to a saw in which the table includes a fixed part to which the fence is attached and a rotatable part with respect to which the saw assembly and fence guide are mounted.

BRIEF DESCRIPTION OF THE SEVERAL VIEWS OF THE DRAWINGS

The present invention will now be described by way of example only with reference to the accompanying drawings, wherein:

FIG. 2a is an enlarged partial side view showing the fence guide;

FIG. 3 is a partial plan view showing the fence guide; and

FIGS. 4 and 5 are partial front views illustrating the use of the fence guide in combination with a fence.

DETAILED DESCRIPTION

Figure 1:
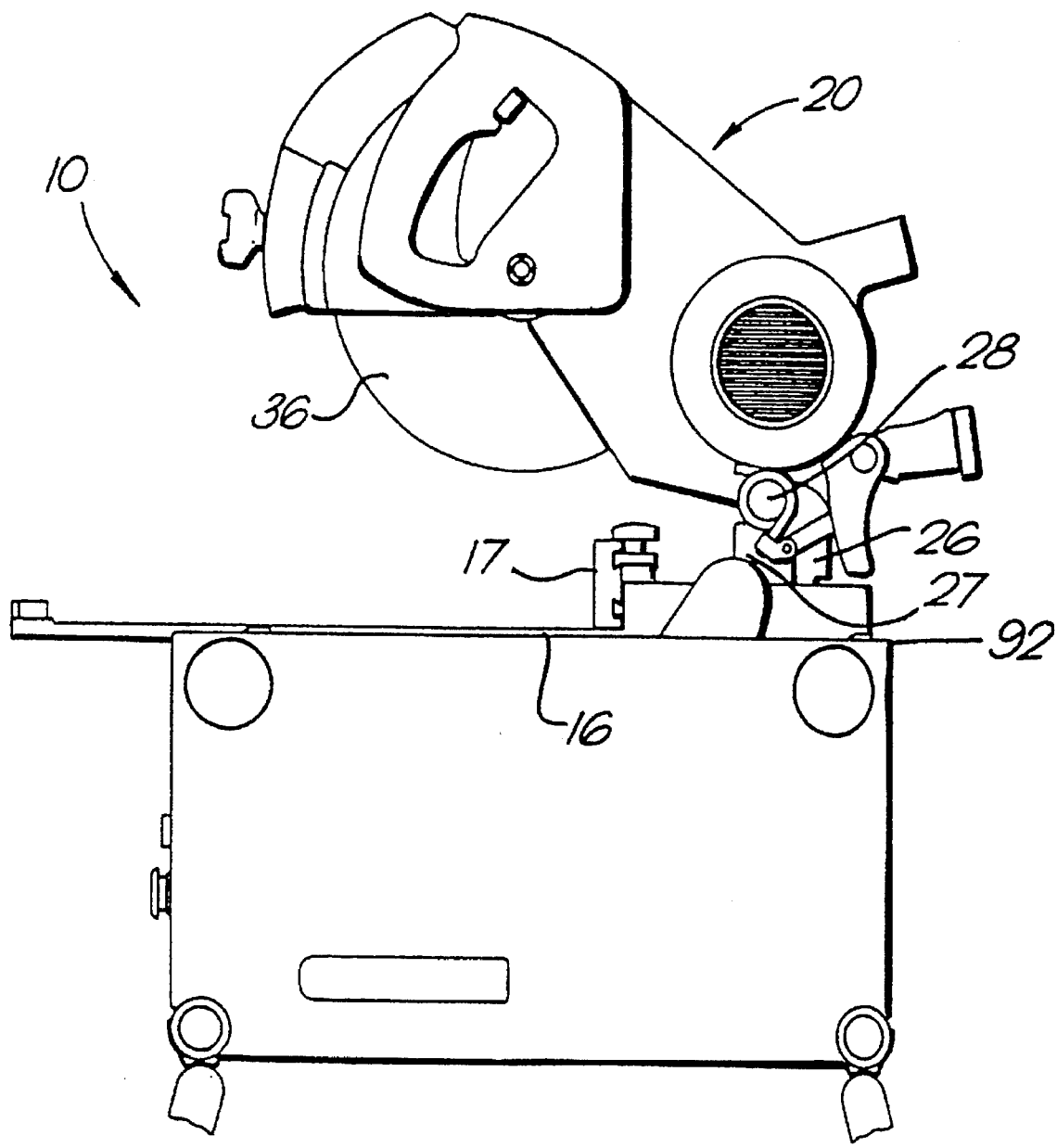
FIG. 1 is a side view of a saw to which the present invention may be applied.

As can be seen from FIG. 1, a saw 10 consists of a saw assembly 20 mounted on a workpiece support or table 16. The mounting is such as to allow pivotal motion of the saw assembly 20 relative to the table 16 about two spaced orthogonal axes 28,92. A pivot member or support 26 is pivotally mounted on the workpiece support or table 16 about a bevel axis 92 which is parallel to the upper and lower surfaces of the workpiece support 16 and coincident with the plane of the saw blade 36. The saw assembly 20 is itself pivotally mounted on the pivot support 26 about a second axis 28 which is perpendicular both to the bevel axis 92 and to the plane of the saw blade 36. Pivoting about the second axis 28 enables the saw assembly 20 to be raised and lowered and allows the saw blade 36 to engage and cut a workpiece supported on the table 16 against a fence 17. A suitable fence arrangement is as described in our copending British application No. 9218389.6.

To enable the saw 10 to perform mitre cuts when operating as a mitre saw, a circular portion 16' of the table 16 is rotatable about a vertical axis with respect to the remainder of the table. This can be seen more clearly from FIG. 3. The saw assembly 20 rotates with the circular portion 16' of the table 16. The fence 17 is fixed in position on the remainder of the table 16.

Pivoting about the bevel axis 92 enables the saw 10 to make bevel cuts. An example of this mode of operation is illustrated in FIG. 5.

Figure 2B:
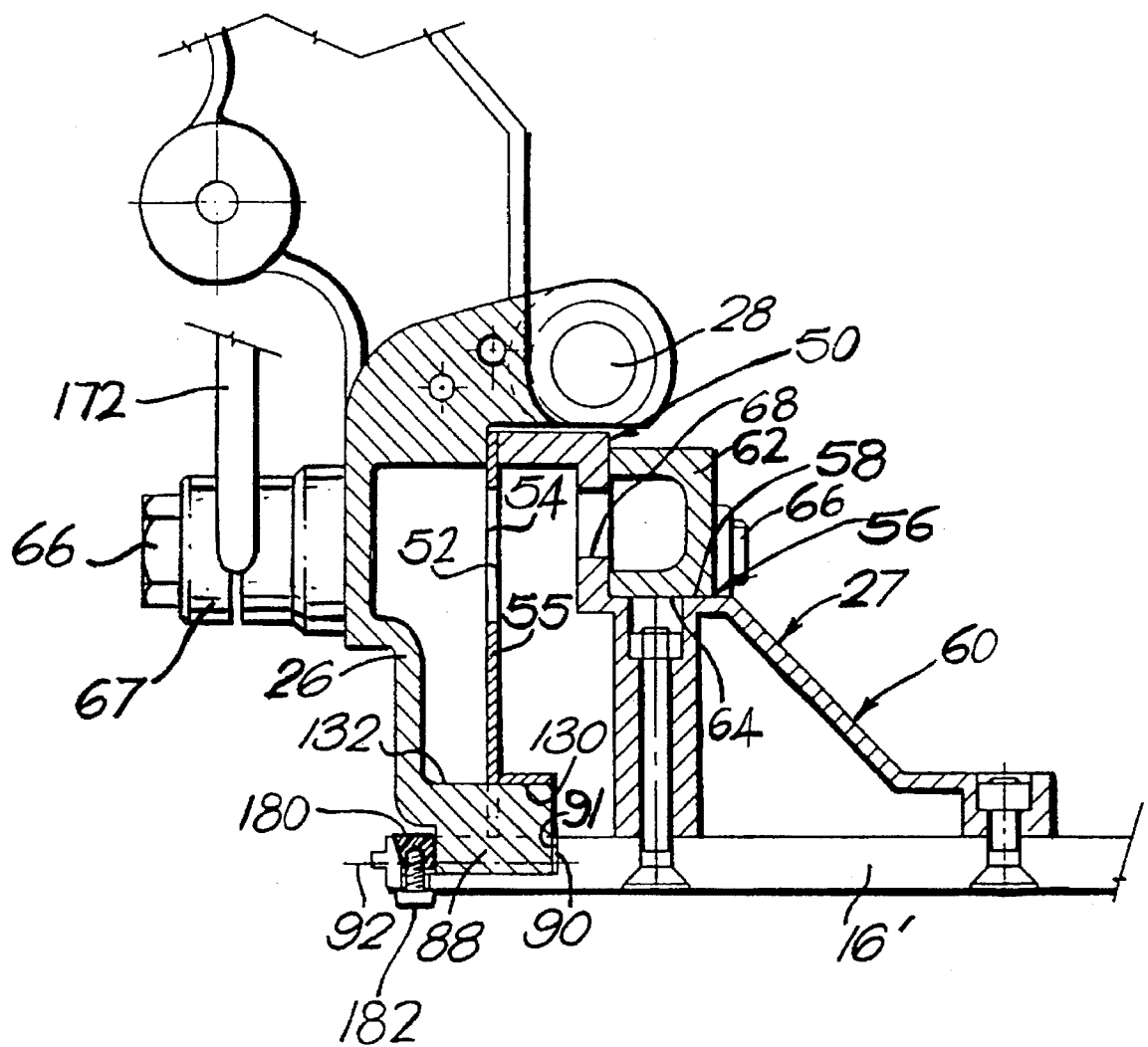
FIG. 2b is a side section similar to FIG. 2a but from the other side.

The pivot constructions are illustrated more clearly in FIGS. 2a and b, 4 and 5. A pivot block 27 is rigidly attached to the rotatable part 16' of the table 16. The pivot block 27 consists essentially of three regions. The rearmost part 50 of the pivot block presents a flat rear surface 52 which co-operates with a front surface 54 of the pivot support 26, a bearing plate 55 separating the two components.

Forward of the rearmost portion 50 of the pivot block 27 is a middle portion 56. This portion presents an exterior part cylindrical surface 58, the function of which will be described in more detail below. Finally, the pivot block 27 has a foremost part-conical portion 60, the purpose of which is to spread the load of the saw assembly over a relatively large area of the rotatable table portion 16'.

The exterior cylindrical surface 58 of the pivot block middle portion 56 supports a guide support 62 which is part-annular in shape and possesses a part-cylindrical inner surface 64, which mates with the part-cylindrical surface 58 of the pivot block middle portion 56. A link pin 66 joins the guide support 62 to the pivot support 26 and passes through a slot 68 in the pivot block rearmost portion 50. The link pin 66 causes the pivot support 26 and the guide support 62 to move in unison and is provided with a nut or other tightening arrangement 67 (and handle 172), whereby the pivot support 26 and the guide support 62 may be fixed in position relative to the pivot block 27. This tightening arrangement may, for example, be such as is described in our copending British patent application No. 9218366.4.

The pivot support 26 is located with respect to the table 16' by an extension 88 of support 26, which extension is received in a groove 90 in the table 16. Groove 90 permits limited rotation of the pivot support about axis 92 with respect to the table.

Any movement of the pivot support 26 relative to the pivot block 27 about the bevel axis 92 is mirrored by a corresponding movement of the guide support 62 about the same axis, the bearing surfaces 58, 64 of the pivot block middle portion 58 and the guide support 62 also being centred on the bevel axis 92. Thus the guide support 62 is arranged rotatable relative to the link pin 66, so that the link pin does not itself need to rotate as the pivot support pivots with respect to the pivot block.

Integrally formed with the guide support 62 is a support arm 70, to the free end of which is attached a fence guide 74. The fence guide 74 is pivotable about a retaining pin 76 between a retracted position, labelled "A" in FIG. 2a, and an extended position, labelled "B" in that figure and also illustrated in FIGS. 3 to 5. A coil spring 72 acts between the guide support arm 70 and the fence guide 74 to bias the latter into its retracted position.

Since the saw blade is pivotally mounted relative to the pivot support 26 and the fence guide is pivotally mounted relative to the guide support 62, the fence guide will always lie in the plane of the saw blade 36.

To determine exactly where the saw blade will impinge upon a workpiece and to position the fence members 17a, 17b accordingly, the operator need only pull the fence guide 74 down from its retracted position to its extended position where it rests upon the workpiece or the workpiece subport 16. FIGS. 3 and 4 illustrate the case where the saw blade descends vertically towards the workpiece support; FIG. 5 illustrates the case where the saw blade descends at 45 degrees to the workpiece support so as to make a bevel cut.

As can clearly be seen from FIGS. 4 and 5, the fence guide 74 includes a leading edge 78 and this leading edge 78 is dimensioned so as to be equally as thick as the cutting thickness of the saw blade. This enables the operator to estimate with accuracy the cut which the saw blade will make in the workpiece. A portion 80, trailing the leading edge 78 of the fence guide 74 is somewhat thicker than the leading edge 78 and this allows the fence members 17a, 17b to be spaced apart an optimum distance. As can be seen from FIGS. 3 to 5, the fence members 17a, 17b may be appropriately selected for the angle of cut to be made.

It goes without saying of course, that the fence guide 74 lies in the plane of the blade 36 and, at least in the position A, the blade, on pivotting about axis 28, must not impinge the guide 74. The same is also true of the housing 20 which, in the plane of the blade 36, has an opening permitting entry of the fence guide 74 within the housing 20 when the latter is pivoted downwardly about axis 28.

Whilst a particular embodiment of the invention has been described above, it will be appreciated that the essential requirement is that the fence guide should always lie in the same plane as the saw blade. It will be evident to those skilled in the art that modifications of detail may be made without departing from the scope of the invention.

I claim:

1. A power saw comprising:
    a table occupying a first substantially horizontal plane;
    a saw assembly mounted on said table;
    a generally planer saw blade connected to said saw assembly;
    a motor connected to said saw assembly to drive said blade;
    wherein said blade occupies and is moveable within a second plane to cut a workpiece supported by said table;
    an elongate fence guide pivotable with respect to said table about a first axis substantially perpendicular to said second plane;
    wherein said saw assembly is pivotable with respect to said table about a second axis substantially parallel to said first axis;

a pivot member pivotally mounted with respect to said table about a third, substantially horizontal axis, said third axis substantially coincident with the plane of said saw blade, said saw assembly and said fence guide being pivotally mounted on said pivot member about the second and first axes respectively; and wherein said fence guide includes a leading edge having a thickness substantially equal to the cutting thickness of said saw blade.

2. A saw as claimed in claim 1 wherein, said fence guide includes a region trailing the leading edge of said fence guide and having a thickness larger than the cutting thickness of said saw blade.

3. A saw as claimed in claim 2, wherein said fence guide is biased towards a retracted position.

4. A saw as claimed in claim 3, further comprising a fence fixed to said table.

5. A saw as claimed in claim 4, wherein said table further comprises:

a fixed part to which said fence is attached; and a rotatable part with respect to which said saw blade and said fence guide are pivotally mounted.

* * * * *